Figure 1:
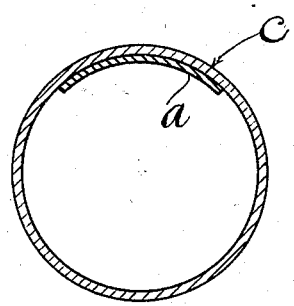

No. 663,001. Patented Dec. 4, 1900.
E. ARTHUR.
SELF HEALING PNEUMATIC TIRE.
(Application filed Dec. 18, 1899.)

(No Model.)

UNITED STATES PATENT OFFICE.

EDWARD ARTHUR, OF LONDON, ENGLAND.

SELF-HEALING PNEUMATIC TIRE.

SPECIFICATION forming part of Letters Patent No. 663,001, dated December 4, 1900.

Application filed December 18, 1899. Serial No. 740,792. (No specimens.)

*To all whom it may concern:*

Be it known that I, EDWARD ARTHUR, residing at 4 Church road, West Drayton, London, in the county of Middlesex, England, have invented certain new and useful Improvements in or Connected with Self-Healing Pneumatic Tires; and I do hereby declare the following to be a full, clear, and exact description of the invention, such as will enable others skilled in the art to which it appertains to make and use the same.

This invention relates to improvements in or connected with self-healing pneumatic tires, and has for its object to provide a composition or material which can be readily applied to the inner tubes of pneumatic tires for cycles and other vehicles, either during the process of manufacture or subsequently thereto, for the purpose of rendering such tires self-healing in the event of their becoming punctured.

Although my invention is primarily intended for application to the inner tubes of double-tube pneumatic tires, yet it may advantageously be applied to pneumatic tires of the single-tube class for the purpose of rendering them self-healing when punctured.

In accordance with this my said invention I thoroughly dissolve a quantity of raw india-rubber in benzin or naphtha and add thereto coal-tar, or Stockholm or archangel tar, or pitch softened by mineral oil in or about the proportion of two parts of the said coal-tar to one part of solid rubber, after which the benzin or naphtha in which the rubber has been dissolved is allowed to evaporate until the desired consistency of the composition is arrived at, whereupon the latter will then be ready for use.

I preferably apply the composition or material produced in the foregoing manner by cutting, pressing, stamping, molding, or otherwise fashioning the said composition or material into strips of suitable dimensions, which strips are then fixed, by means of suitable solution or its equivalent, to the outer periphery of the inner tube of the pneumatic tire or to the inside of the outer casing of the tire, such strips being further held in place upon the inner tube of the tire by means of an india-rubber cover placed over the said inner tube and the strips of composition or material aforesaid.

The strips of composition or material prepared in the manner hereinbefore specified may either be applied to the tires during any suitable stage of their manufacture or such strips may conveniently be applied to the tires when the latter are in their finished state and either before they have been in use or subsequently thereto.

In order that this invention may be more readily understood, reference is hereby made to the accompanying drawings, wherein—

Figure 2:
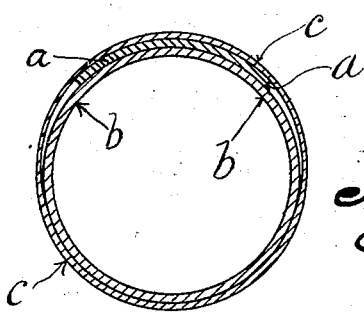

Figure 1 is a sectional view of the outer casing of an inner tube of a pneumatic tire with my self-healing strip applied thereto, while Fig. 2 is a similar view of an inner tube and outer casing constructed in accordance with this complete invention.

Referring to the drawings, wherein like letters of reference indicate corresponding parts wherever occurring, *a* represents the self-healing strip, which, as aforesaid, may be attached by solution or other suitable means either to the outer periphery of the inner tube *b* or to the inside of the outer casing *c*, as may be found desirable or convenient.

What I claim as my invention, and desire to secure by Letters Patent, is—

The improvements in or connected with self-healing pneumatic tires consisting in the composition of a material for rendering such tires self-healing in the event of puncture, said composition being produced by dissolving raw rubber, in benzin or naphtha and adding thereto, either coal-tar, or Stockholm or archangel tar, or pitch softened by mineral oil in or about the proportions hereinbefore stated, said composition being fashioned into strips and applied by solution or other means to either the outer periphery of the inner tube or the inside of the outer casing said strips being further held in place by means of the ordinary outer cover substantially as hereinbefore described and shown.

In testimony whereof I hereunto affix my signature in presence of two witnesses.

EDWARD ARTHUR.

Witnesses:
F. G. HUGHES,
D. E. SCALTOCK.